United States Patent [19]

Fukushima et al.

[11] Patent Number: 5,798,998
[45] Date of Patent: Aug. 25, 1998

[54] OPTICAL DISC REPRODUCING DEVICE

[75] Inventors: Yoshimitsu Fukushima; Shigeharu Furusawa; Satoru Anada, all of Saitama-ken, Japan

[73] Assignee: Pioneer Electronic Corporation, Tokyo, Japan

[21] Appl. No.: 795,775

[22] Filed: Feb. 5, 1997

[30] Foreign Application Priority Data

Feb. 6, 1996 [JP] Japan ................................. 8-044265

[51] Int. Cl.$^6$ ............................ G11B 33/02; G11B 17/08
[52] U.S. Cl. ................................. 369/178; 369/75.2
[58] Field of Search ........................ 369/178, 36, 191, 369/37, 38, 179, 192, 75.1, 75.2; 360/98.04, 98.06; 312/9.11, 9.29, 9.32, 9.45, 9.48, 9.52; 206/308.1; 220/330, 255, 256, 259

[56] References Cited

U.S. PATENT DOCUMENTS

| | | | |
|---|---|---|---|
| 4,695,990 | 9/1987 | Kawakami | 369/38 |
| 5,550,801 | 8/1996 | Enomoto et al. | 369/178 |
| 5,611,607 | 3/1997 | Kuzara et al. | 312/9.14 |
| 5,615,202 | 3/1997 | Enomoto et al. | 369/178 |

*Primary Examiner*—Stuart S. Levy
*Assistant Examiner*—William J. Klimowicz
*Attorney, Agent, or Firm*—Nikaido, Marmelstein, Murray & Oram LLP

[57] ABSTRACT

There is provided an optical disc reproducing device, comprising: a frame case having an opening formed on one side thereof; a disc reproducing section disposed within the frame case; a disc receiving section capable of receiving and holding a plurality of discs, the disc receiving section being mainly provided within the frame case adjacent to the opening thereof; a carrier for picking up a selected disc from the disc receiving section and moving the selected disc to the disc reproducing section. Here, the disc receiving section includes a disc holder and a disc cover, the disc holder is provided adjacent to a lower portion of the opening of the frame case in a manner such that the disc holder is pivotable with respect to the frame case, whilst the disc cover is provided adjacent to an upper portion of the opening of the frame case in a manner such that the disc cover is also pivotable with respect to the frame case.

7 Claims, 8 Drawing Sheets ns. 798,998

OPTICAL DISC REPRODUCING DEVICE

BACKGROUND OF THE INVENTION

The present invention relates to an optical disc reproducing device, particularly to an optical disc reproducing device including a disc reproducing section and a disc receiving section, the later of which is capable of receiving a plurality of optical discs and allowing the movement of a selected disc to the disc reproducing section.

FIG. 6 is a schematic perspective view showing a conventional optical disc reproducing device. As illustrated in FIG. 6, the conventional disc reproducing device comprises a frame case 101, a door 110 attached to an opening formed on one side of the frame case 101, so that it is able to open or close the opening of the frame case 101. Inside the frame case 101, there are provided several disc receiving sections 300 arranged in a predetermined direction to receive a plurality of optical discs.

Referring again to FIG. 6, a disc reproducing section 200 is provided within the frame case 101. In detail, the disc reproducing section 200 is located close to the receiving sections 300, in a manner such that it can move along these disc receiving sections 300, in a direction as shown by an arrow A in the drawing. In this way, the disc reproducing section 200 may approach a desired disc to be reproduced, select the desired disc to cause it to move from a receiving section 300 to the disc reproducing section 200 by virtue of a carrier means 220 which is integrally connected with the disc reproducing section 200.

FIG. 7 is another schematic perspective view showing a condition where a plurality of discs are received in the several disc receiving sections 300. As illustrated in FIG. 7, each section 300 receives a predetermined number of discs which are arranged in an upright vertical position, a thin separator plate (not shown) is disposed between every two adjacent discs so as to separate them from one another.

Referring again to FIG. 7, all the disc receiving sections 300 are provided to be pivotable about a fulcrum 302, so that they may pivot reciprocatingly in a direction B from a position capable of disc changing to a position capable of being picked up by the carrier means 220 for reproduction.

FIGS. 8a and 8b are cross sectional views showing the conventional optical disc reproducing device of FIG. 6. FIG. 8a illustrates the disc reproducing device with its disc receiving sections 300 in a position capable of disc changing. FIG. 8b illustrates the disc reproducing device with its disc receiving sections 300 in a position where a selected disc may be picked up by the carrier means 220 for reproduction.

Referring to FIG. 8a, when the disc receiving sections 300 are in a position capable of disc changing, the sections 300 will project a great deal outwardly from the frame case 101 so that disc changing may be performed in a space completely outside of the frame case 101. At this time, since an opening 101a formed on one side of the frame case 101 is closed by the disc receiving sections 300 themselves, discs 310 held on the sections 300 are completely separated from the disc reproducing section 200, thus avoiding an operational mistake that a disc being held by a disc receiving section 300 is accidentally moved toward the disc reproducing section 200.

Referring to FIG. 8b, after the disc receiving sections 300 are caused to pivot for 90 degrees about the fulcrum 302 in the clockwise direction (in the drawing), the disc receiving sections 300 will be completely received into the frame case 101, changing into a position where a plurality of discs are properly received in the sections 300 within the frame case 101 and a selected disc may be picked up by the carrier means 220 so as to be moved to the disc reproducing section 200 for reproduction. At this moment, since the opening 101a formed on one side of the frame case 101 is also closed by the disc receiving sections 300 themselves, an undesired (mistaken) disc changing operation from outside may be exactly prevented during the disc reproduction, thus ensuring a proper disc reproduction and avoiding any possible damages to the interior of the disc reproducing device.

However, as illustrated in FIG. 8a, since the sections 300 will project a great deal outwardly from the frame case 101 when the disc changing is being performed from outside, a considerable large additional space is required for such a conventional disc reproducing device.

SUMMARY OF THE INVENTION

It is an object of the present invention to provide an improved optical disc reproducing device which does not need a large additional space to perform disc changing, so as to solve the above-mentioned problems peculiar to the above-mentioned prior arts.

According to the present invention, there is provided an optical disc reproducing device, comprising: a frame case having an opening formed on one side thereof; a disc reproducing section disposed within the frame case; a disc receiving section capable of receiving and holding a plurality of discs, said disc receiving section being mainly provided within the frame case adjacent to the opening thereof; a carrier means for picking up a selected disc from the disc receiving section and moving the selected disc to the disc reproducing section. Here, the above disc receiving section includes a disc holder and a disc cover, the disc holder is provided adjacent to a lower portion of the opening of the frame case in a manner such that the disc holder is pivotable with respect to the frame case, whilst the disc cover is provided adjacent to an upper portion of the opening of the frame case in a manner such that the disc cover is also pivotable with respect to the frame case.

According to one aspect of the present invention, the disc holder is provided to receive lower portions of a plurality of discs, whilst the disc cover is provided to cover upper portions of a plurality of discs.

According to another aspect of the present invention, the disc holder and the disc cover are connected with each other through a link mechanism, in a manner such that a turning of the disc cover in one direction will cause a turning of the disc holder in an opposition direction.

In detail, one end of the link mechanism is pivotally connected to the disc holder, the other end of the link mechanism is pivotally connected to the disc cover.

According to further aspect of the present invention, the disc holder and the disc cover are adapted to get in contact with each other outside of the opening of the frame case, so as to close the opening to form a condition where a plurality of discs have been received in the disc receiving section, and any one of the discs may be picked up and moved from the disc receiving section to the disc reproducing section.

According to a still further aspect of the present invention, the disc holder and the disc cover are adapted to get in contact with each other within the frame case, so as to open the opening of the frame case to form a condition where the discs received in the disc receiving section may be replaced by other different discs from outside.

The above objects and features of the present invention will become more understood from the following description with reference to the accompanying drawings.

DETAILED DESCRIPTION OF THE PREFERRED EMBODIMENTS

Figure 1:
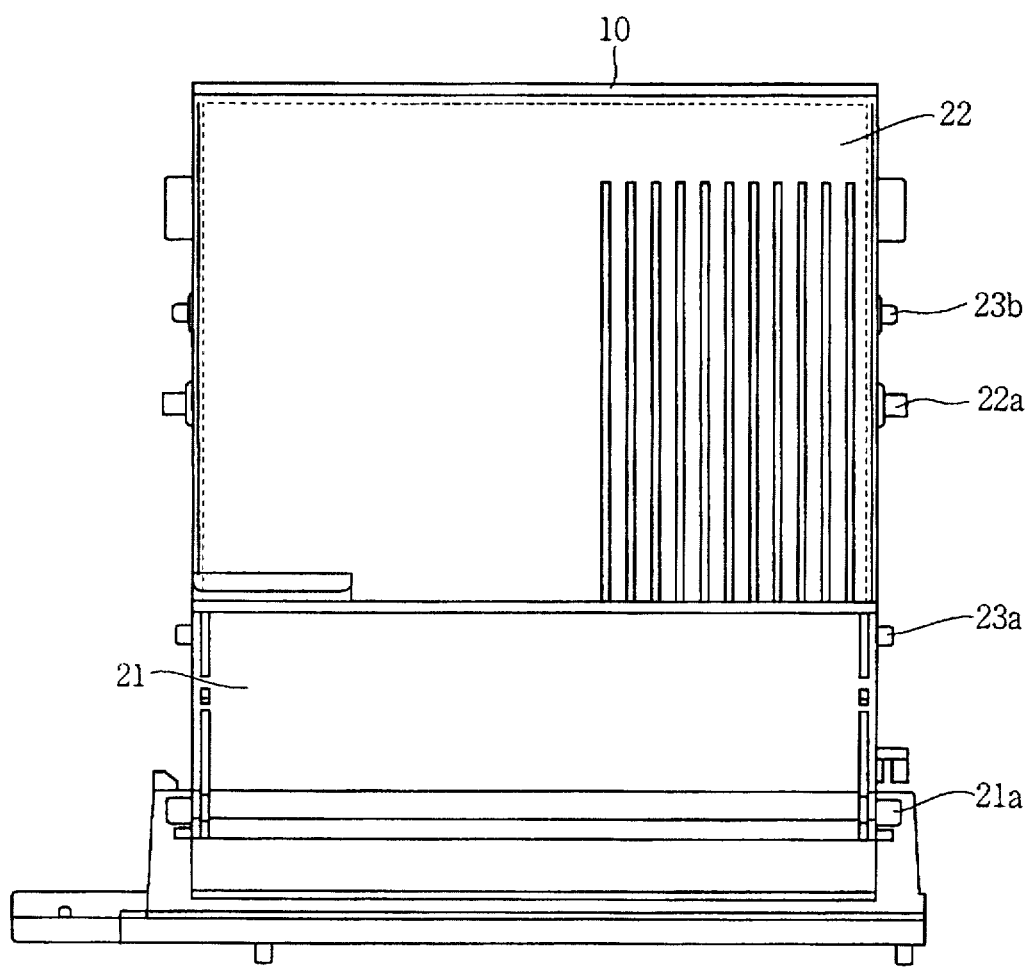
FIG. 1 is a front view of an optical disc reproducing device according to the present invention.
Figure 2:
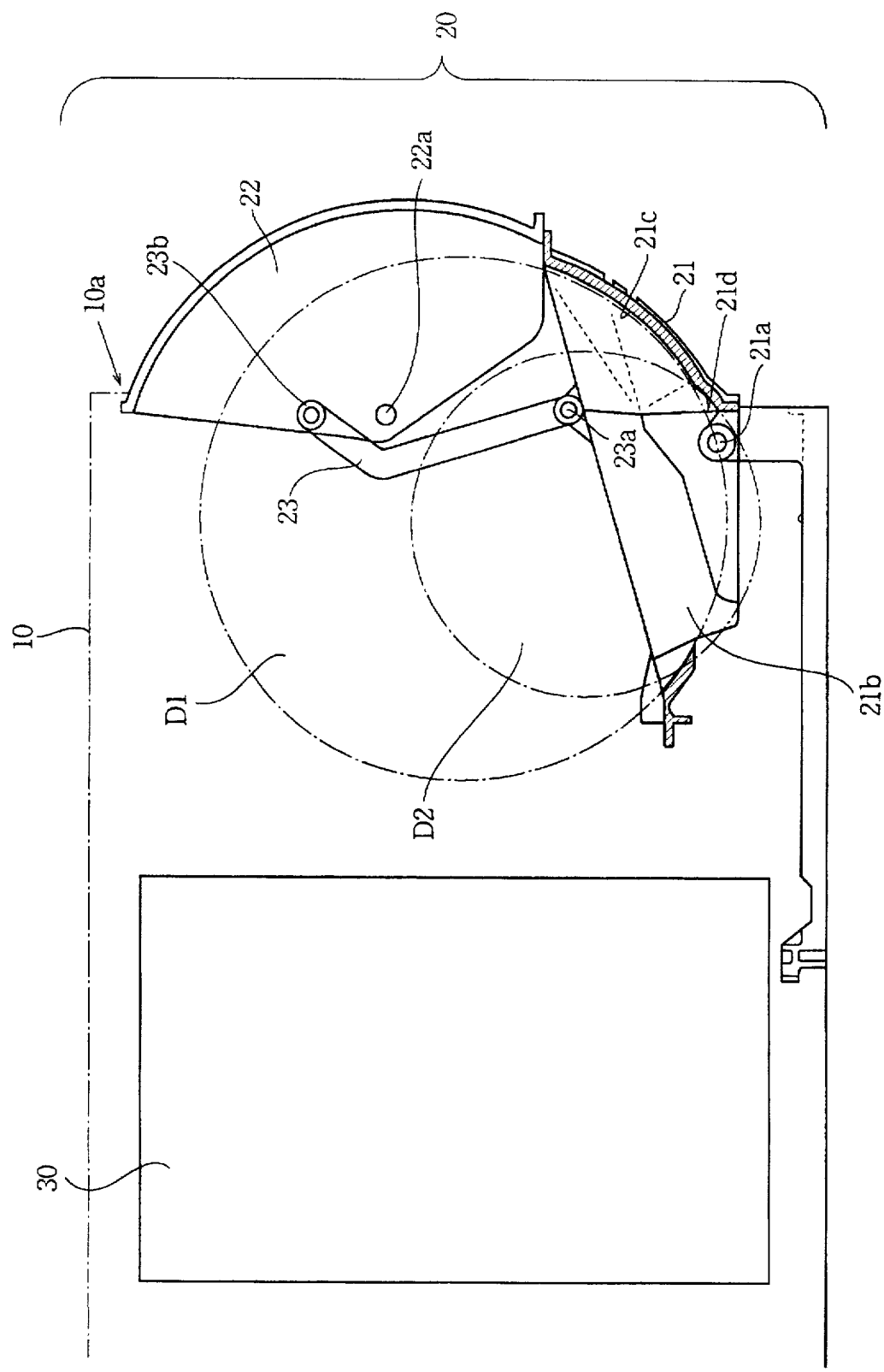
FIG. 2 is a cross sectional view showing the optical disc reproducing device of FIG. 1.

Referring to FIGS. 1 and 2, an optical disc reproducing device of the present invention comprises a frame case 10 having an opening 10a formed on one side thereof. A disc receiving section 20 is provided adjacent to the opening 10a, with most part thereof being received within the frame case 10. A disc reproducing section 30, which includes a turn table (not shown) and an optical pickup (not shown), is provided within the frame case 10 in a position opposite (relatively far away) to the opening 10a.

The disc receiving section 20 includes a disc holder 21, a disc cover 22 and a link mechanism 23, and constructed such that a plurality of discs may be received in the receiving section 20 in an upright vertical position. When the disc holder 20 and the disc cover 22 are in their positions shown in FIG. 2, the opening 10a may be closed so as to prevent any possible foreign things to enter the frame case 10.

Similar to prior art, the disc reproducing section 30 is provided to be movable in a direction along which the plurality of discs are arranged. Thus, the disc reproducing section 30 may approach a desired disc to be selected for reproduction, select the desired disc and cause it to move from the receiving section 20 to the reproducing section 30 by virtue of a carrier means (not shown) which may be integrally associated with the reproducing section 30.

Referring again to FIG. 2, the disc cover 22 is provided adjacent to an upper portion of the opening 10a of the frame case 10, by means of a fulcrum 22a so that it is pivotable about the fulcrum 22a with respect to the frame case 10. The disc holder 21 is provided adjacent to the lower portion of the opening 10a of the frame case 10, by means of a fulcrum 21a so that it is pivotable about the fulcrum 21a with respect to the frame case 10. The disc cover 22 and disc holder 21 are operatively connected with each other through the link mechanism 23. In detail, the link mechanism 23 is connected through its end 23b to the disc cover 22, and is connected through its end 23a to the disc holder 21. Namely, one end 23a of the link mechanism 23 is pivotally connected to the disc holder 21, the other end 23b of the link mechanism 23 is pivotally connected to the disc cover 22.

Referring further to FIG. 2, the disc holder 21 is provided to receive the lower portions of a plurality of discs so as to hold these discs. Similar to prior art, a plurality of thin separator plates 21b are provided such that each of them is disposed between every two adjacent discs so as to separate the two adjacent discs from one another. Further, the inner wall of each space (formed between every two thin separator plates 21b) for receiving and holding a disc, include a first holding portion 21c and a second holding portion 21d. The first holding portion 21c has almost the same curvature compatible with that of a larger disc D1, the second holding portion 21d has almost the same curvature compatible with that of a smaller disc D2. Thus, each space for receiving and holding a disc may engage with the outer edge of either a larger disc D1 or a small disc D2, so as to properly receive and hold a larger disc D1 or a smaller disc D2.

The disc cover 22 is connected with the frame case 10 by means of a fulcrum 22a so that it is pivotable about the fulcrum 22a and can cover the upper portions of a plurality of discs which have been received and held on the disc holder 21. Here, since the disc cover 22 is made from a semi-transparent material, it is easy for a user to see from outside whether there are discs received in the disc holder 21.

As discussed above, the link mechanism 23 is provided to operatively connect the disc holder 21 with the disc cover 22. One end 23a of the link mechanism 23 is pivotally connected to the disc holder 21, and the other end 23b of the link mechanism 23 is pivotally connected to the disc cover 22. The link mechanism 23 has been formed into a generally V-shape as shown in FIGS. 2–5. With the use of such a construction, when the disc cover 22 is turned in one direction, the disc holder 21 will be caused to turn in an opposite direction.

Now, the operation of the optical disc reproducing device according to the present invention will be described as follows, also with reference to FIGS. 2–5.

FIG. 2 indicates a condition where a plurality of discs D1 or D2 have been received on the disc holder 21 within the frame case 10. At this moment, since the disc holder 21 and the disc cover 22 are in contact with each other at a position outside of the opening 10a of the frame case 10, the opening 10 is in a closed condition, so that the interior of the frame case 10 can be protected from any possible undesired touching from outside. Meanwhile, as to the internal, conditions of the frame case 10, since the disc holder 21 is opened toward the disc reproducing section 30, any one of the discs held on the disc holder 21 may be picked up and moved by a carrier means (not shown) to the disc reproducing section 30 for reproduction.

On the other hand, when disc changing is to be performed, the disc cover 22 is turned in the counterclockwise direction as viewed in FIG. 2, with the fulcrum 22a acting as a turning center. As can be understood from FIGS. 2–5, the turning of the disc cover 22 in the counterclockwise direction will cause a downward movement of the link mechanism 23. Thus, upon being pushed down by the end 23a of the link mechanism 23, the disc holder 21 will be forced to turn in the clockwise direction, with the fulcrum 21a acting as a turning center.

Figure 3:
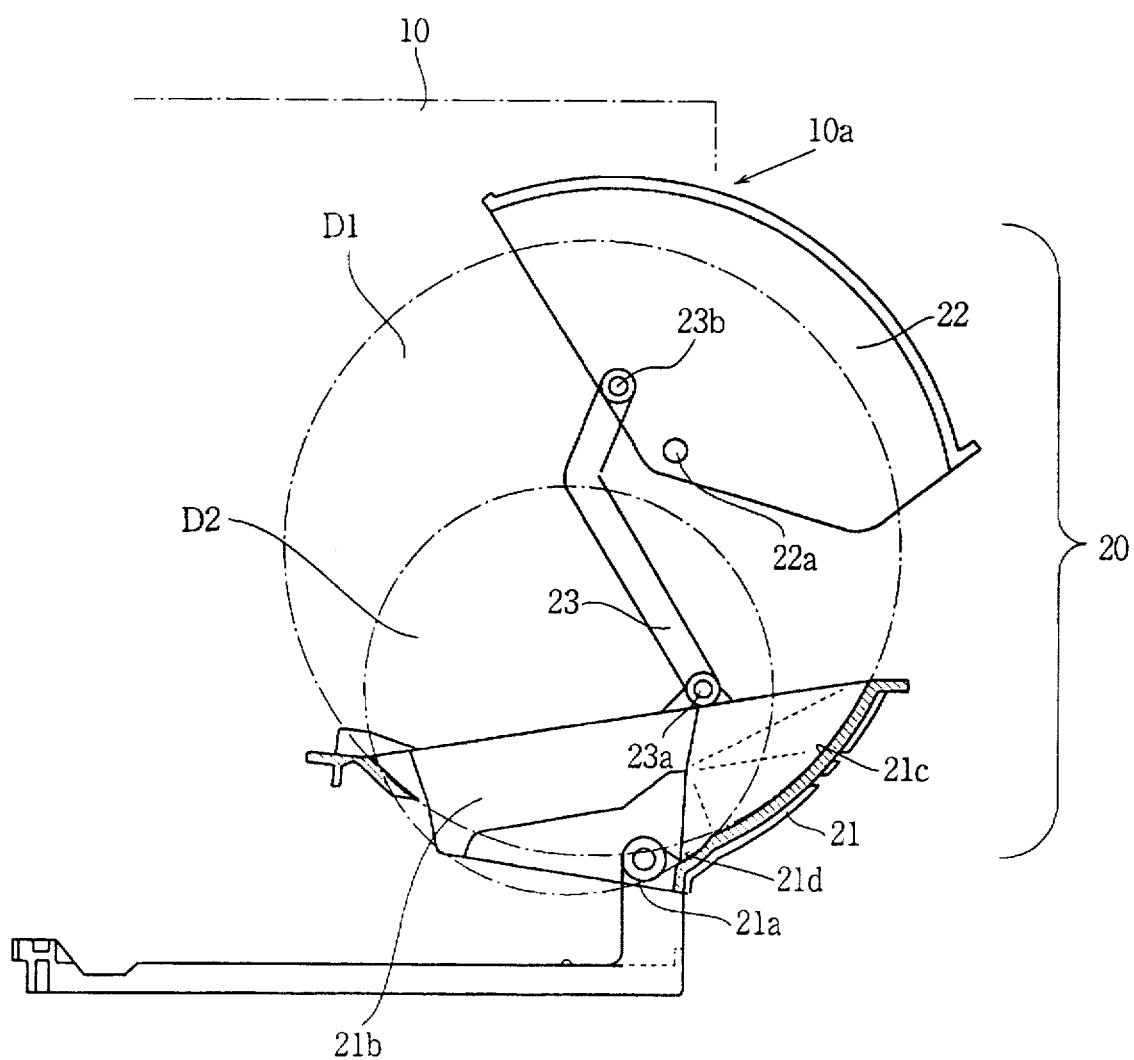
FIG. 3 is a cross sectional view showing one condition of the optical disc reproducing device of FIG. 1.
Figure 4:
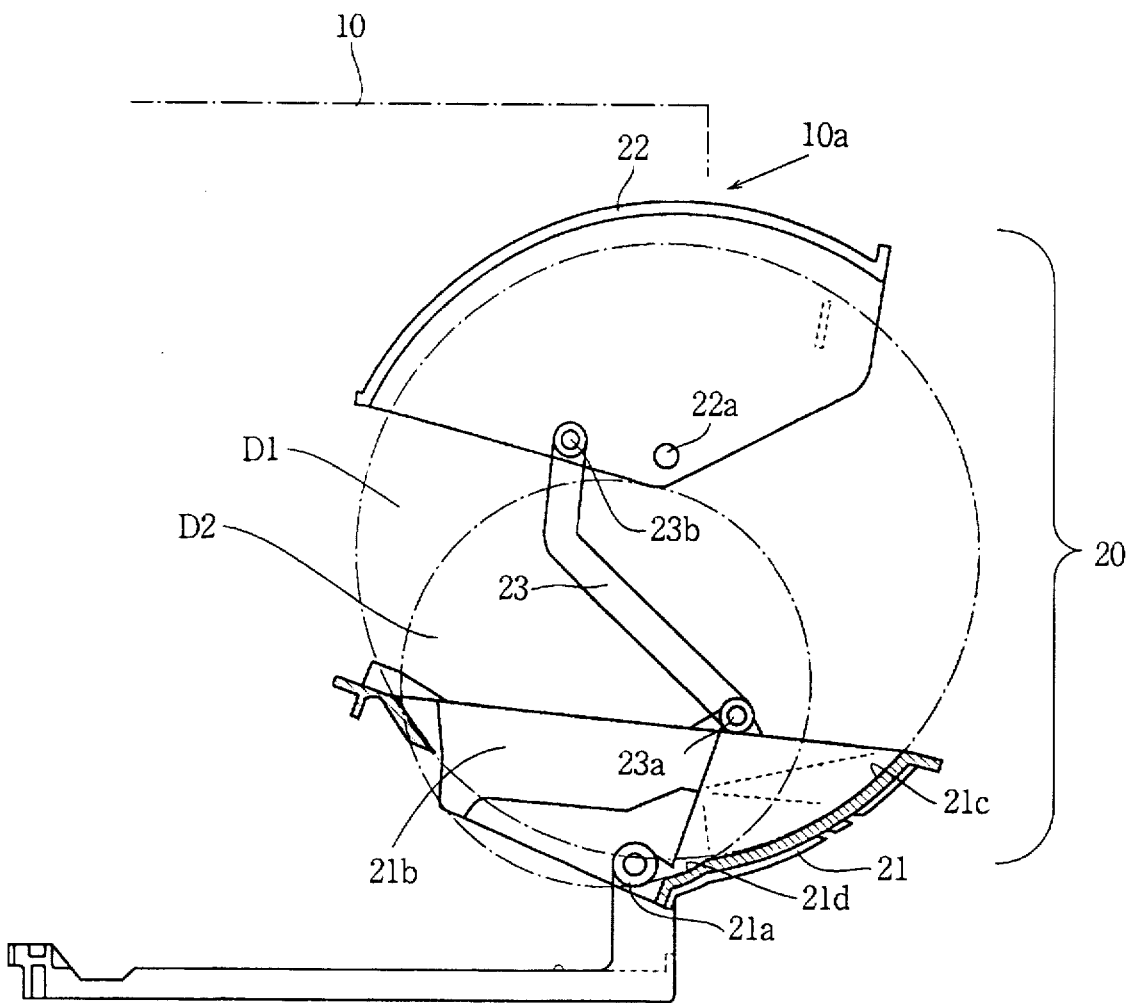
FIG. 4 is a cross sectional view showing another condition of the optical disc reproducing device of FIG. 1.
Figure 5:
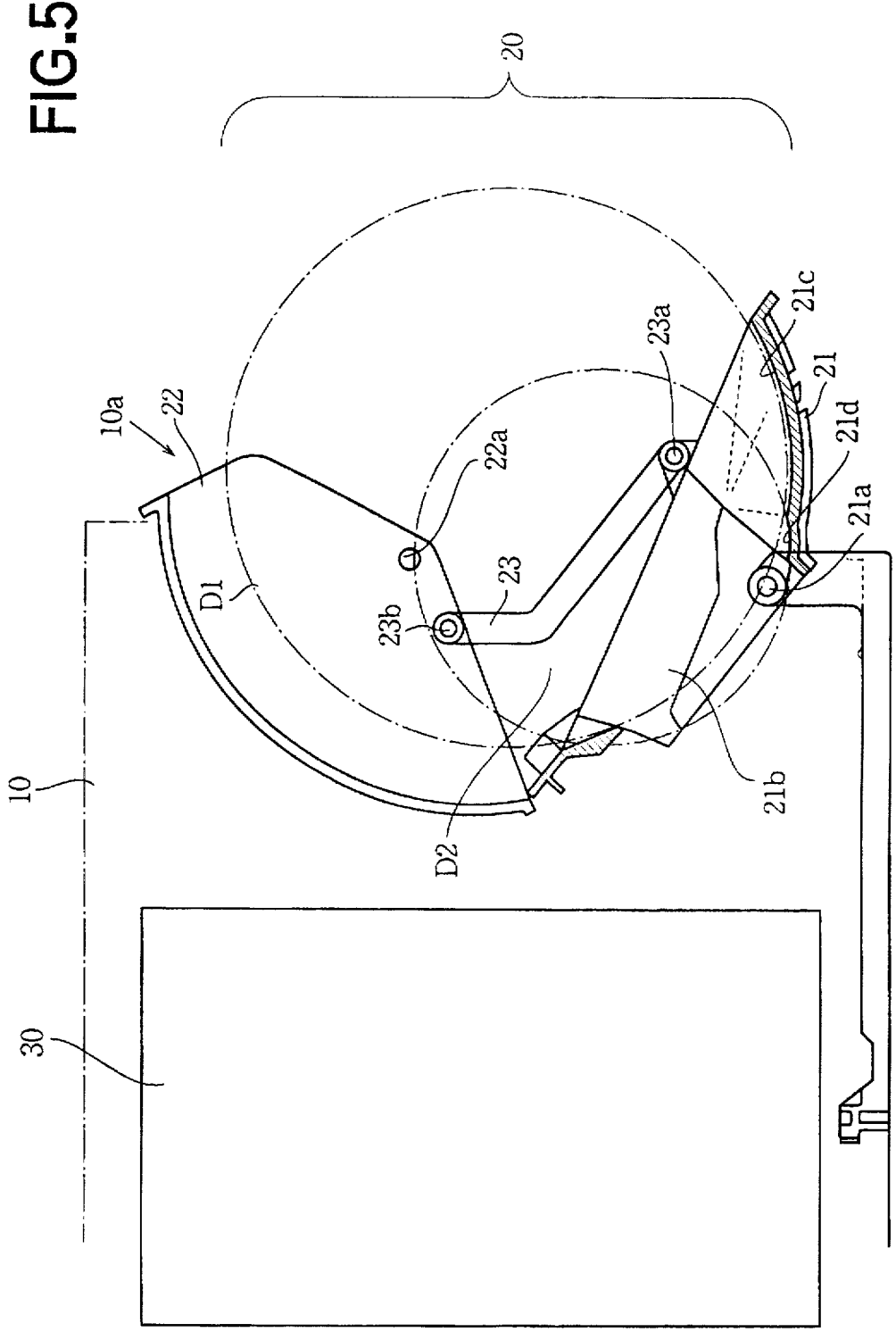
FIG. 5 is a cross sectional view showing a further condition of the optical disc reproducing device of FIG. 1.
Figure 6:
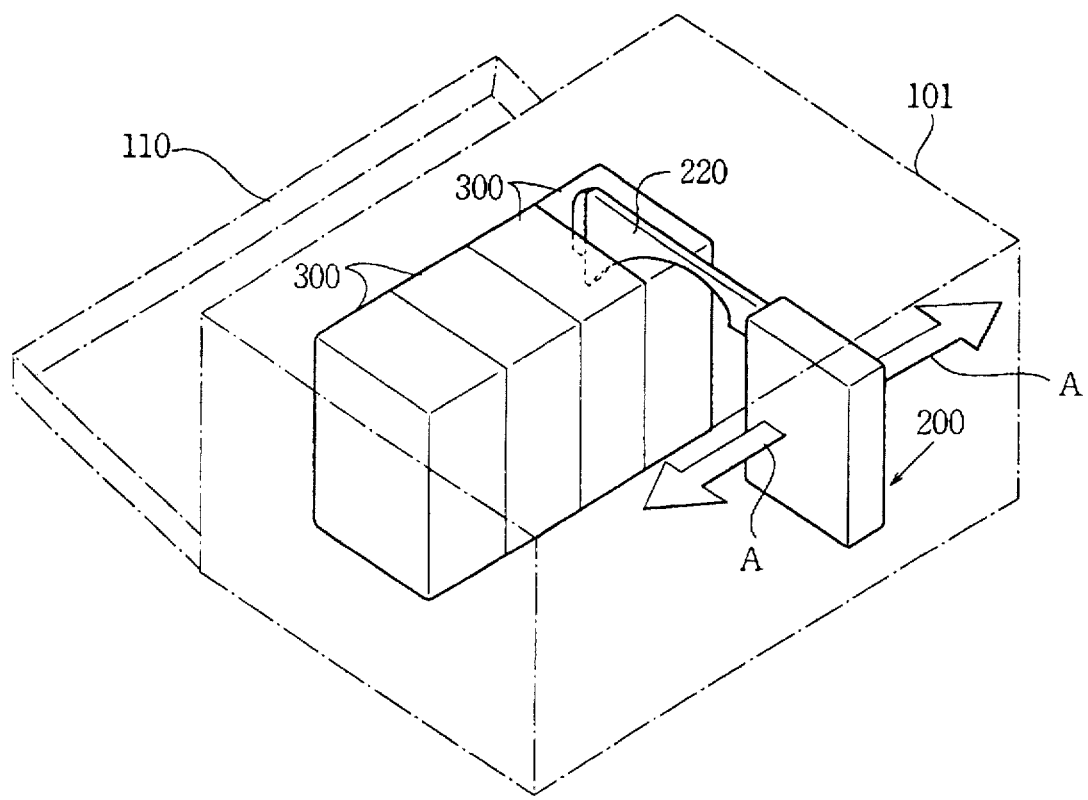
FIG. 6 is a schematic perspective view showing a conventional optical disc reproducing device.
Figure 7:
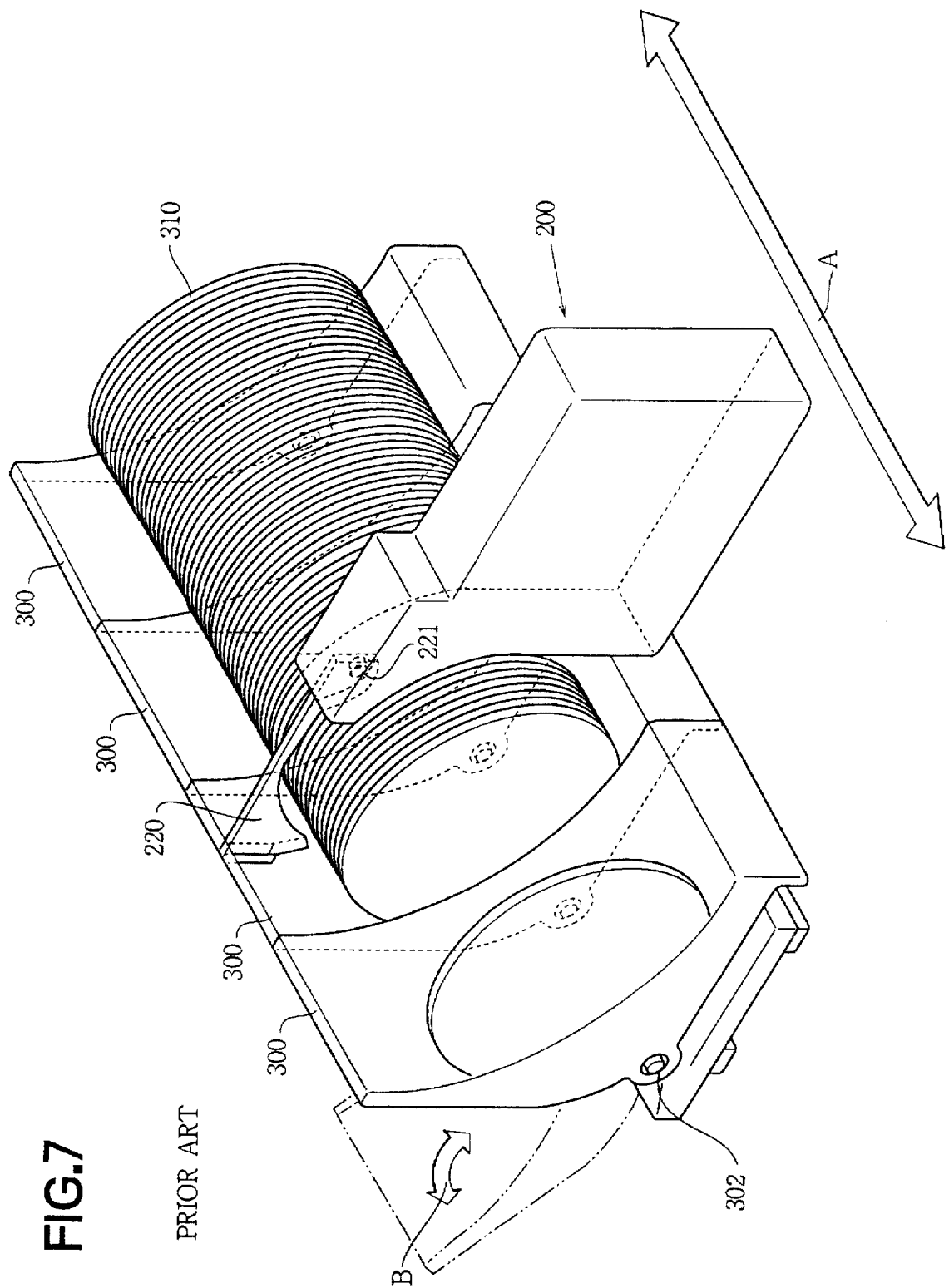
FIG. 7 is another schematic perspective view showing a condition where a plurality of discs are received in several disc receiving sections.

In this way, a relative positional relation between the disc holder 21 and disc cover 22 (shown in FIG. 2) is changed, through intermediate steps shown in FIGS. 3 and 4, into a relation shown in FIG. 5. As illustrated in FIGS. 2–5, the counterclockwise turning of the disc cover 22 and the clockwise turning of the disc holder 21 will be continued until both are get in contact with each other at a position close to the disc reproducing section 30 (see FIG. 5).

In a condition illustrated in FIG. 5, since the opening 10a of the frame case 10 is in an opened position, the discs D1 or D2 held on the disc holder 21 may be easily replaced by other desired different discs from outside. Further, as shown in FIG. 5, since the disc reproducing section 30 is completely separated from discs D1 or D2 by the disc holder 21 and the disc cover 22, it is sure to avoid a problem that a disc D1 or D2 is accidentally (as an operation mistake) moved to the disc reproducing section 30 during a process of disc changing.

Figure 8:
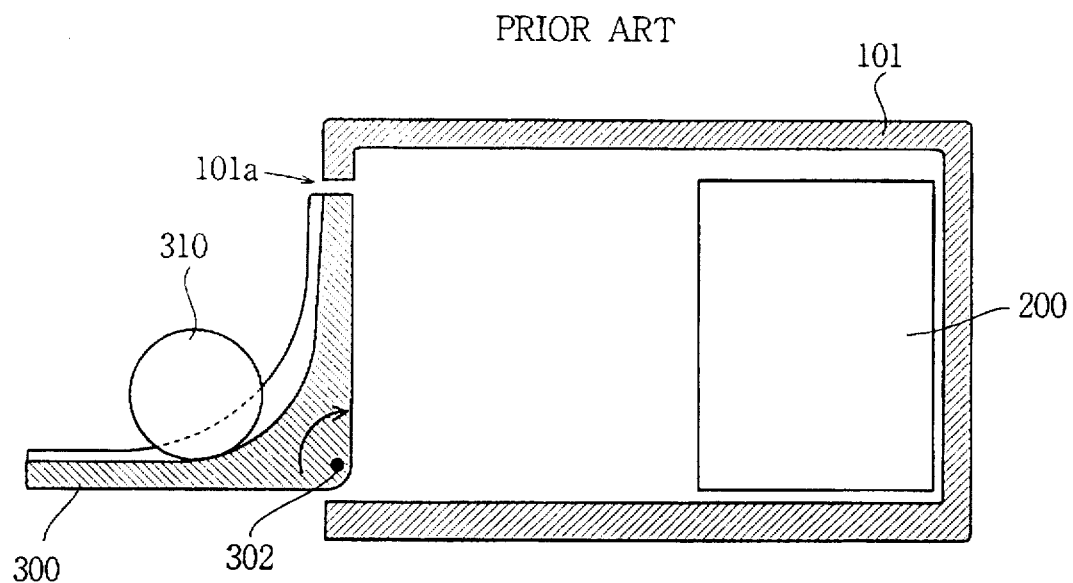
FIGS. 8a and 8b are cross sectional views showing an operation of the conventional optical disc reproducing device of FIG. 6.
Figure 8:
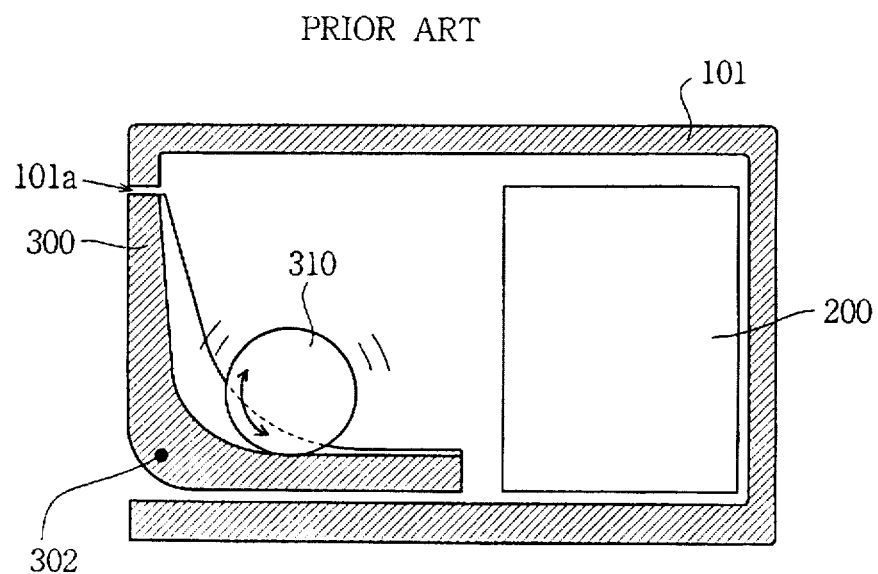

As is understood from FIGS. 2–5, since the disc holder 21 is required to turn only a smaller amount as compared with a disc receiving section 300 (FIG. 8a) associated with a conventional disc reproducing device, the disc holder 21 does not have to project greatly from the frame case 10. Therefore, it is not necessary to have a large space in front of the opening 10a of the frame case 10, thus greatly reducing a space required for the disc reproducing device.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical disc reproducing device, comprising:

a frame case having an opening formed on one side thereof;

a disc reproducing section disposed within the frame case;

a disc receiving section capable of receiving and holding a plurality of discs, said disc receiving section being mainly provided within the frame case adjacent to the opening thereof;

a carrier means for picking up a selected disc from the disc receiving section and moving the selected disc to the disc reproducing section;

wherein the disc receiving section includes a disc holder and a disc cover, the disc holder is provided adjacent to a lower portion of the opening of the frame case in a manner such that the disc holder is pivotable with respect to the frame case, while the disc cover is provided adjacent to an upper portion of the opening of the frame case in a manner such that the disc cover is also pivotable with respect to the frame case, wherein the disc holder and the disc cover are connected through a link mechanism, such that a turning of the disc cover in one direction causes a turning of the disc holder in an opposite direction whereby the pivotal motion of the disc cover in said one direction and the corresponding pivotal motion of the disc holder in said opposite direction allows access to a plurality of discs by a user from the outside of the frame case and wherein the pivotal motion of the disc cover in said opposite direction and the corresponding pivotal motion of the disc holder in said one direction, allows access to the plurality of discs inside the frame case by the carrier means.

2. An optical disc reproducing device according to claim 1, wherein the disc holder is provided to receive lower portions of a plurality of discs, while the disc cover is provided to cover upper portions of a plurality of discs.

3. An optical disc reproducing device according to claim 1, wherein one end of the link mechanism is pivotally connected to the disc holder, the other end of the link mechanism is pivotally connected to the disc cover.

4. An optical disc reproducing device according to claim 1, wherein the disc holder is provided with a plurality of thin separator plates, so that every two adjacent discs held on the disc holder may be separated from each other by one of the thin separator plates.

5. An optical disc reproducing device according to claim 1, wherein the disc cover is made of a semi-transparent material, so that discs received in the disc receiving section may be identified.

6. An optical disc reproducing device, comprising:

a frame case having an opening formed on one side thereof;

a disc reproducing section disposed within the frame case;

a disc receiving section capable of receiving and holding a plurality of discs, said disc receiving section being mainly provided within the frame case adjacent to the opening thereof;

a carrier means for picking up a selected disc from the disc receiving section and moving the selected disc to the disc reproducing section;

wherein the disc receiving section includes a disc holder and a disc cover, the disc holder is provided adjacent to a lower portion of the opening of the frame case in a manner such that the disc holder is pivotable with respect to the frame case, while the disc cover is provided adjacent to an upper portion of the opening of the frame case in a manner such that the disc cover is also pivotable with respect to the frame case, wherein the disc holder and the disc cover are adapted to contact each other outside of the opening of the frame case, so as to close the opening to form a condition where a plurality of discs have been received in the disc receiving section, and any one of the discs may be picked up and moved from the disc receiving section to the disc reproducing section.

7. An optical disc reproducing device, comprising:

a frame case having an opening formed on one side thereof;

a disc reproducing section disposed within the frame case;

a disc receiving section capable of receiving and holding a plurality of discs, said disc receiving section being mainly provided within the frame case adjacent to the opening thereof;

a carrier means for picking up a selected disc from the disc receiving section and moving the selected disc to the disc reproducing section;

wherein the disc receiving section includes a disc holder and a disc cover, the disc holder is provided adjacent to a lower portion of the opening of the frame case in a manner such that the disc holder is pivotable with respect to the frame case, while the disc cover is provided adjacent to an upper portion of the opening of the frame case in a manner such that the disc cover is also pivotable with respect to the frame case, wherein the disc holder and the disc cover are configured to contact each other within the frame case, so as to open the opening of the frame case to form a condition where the discs received in the disc receiving section may be replaced by other different discs from outside.

* * * * *